(12) United States Patent
Lin et al.

(10) Patent No.: US 10,782,872 B2
(45) Date of Patent: Sep. 22, 2020

(54) ELECTRONIC DEVICE WITH TOUCH PROCESSING UNIT

(71) Applicant: ASUSTeK COMPUTER INC., Taipei (TW)

(72) Inventors: He-Shiang Lin, Taipei (TW); Ding-Chia Kao, Taipei (TW)

(73) Assignee: ASUSTEK COMPUTER INC., Taipei (TW)

(*) Notice: Subject to any disclaimer, the term of this patent is extended or adjusted under 35 U.S.C. 154(b) by 0 days.

(21) Appl. No.: 16/517,731

(22) Filed: Jul. 22, 2019

(65) Prior Publication Data

US 2020/0034017 A1    Jan. 30, 2020

Related U.S. Application Data

(60) Provisional application No. 62/703,900, filed on Jul. 27, 2018.

(30) Foreign Application Priority Data

May 6, 2019    (TW) .............................. 108115609 A

(51) Int. Cl.
*G06F 3/0488*    (2013.01)
*G06F 3/038*    (2013.01)
*G06F 3/0354*    (2013.01)

(52) U.S. Cl.
CPC ............ *G06F 3/0488* (2013.01); *G06F 3/038* (2013.01); *G06F 3/03547* (2013.01)

(58) Field of Classification Search
CPC ..................................................... G06F 3/0488
See application file for complete search history.

(56) References Cited

U.S. PATENT DOCUMENTS

| 8,599,106 | B2 | 12/2013 | Gimpl et al. |
| 9,310,926 | B2 | 4/2016 | Chung |
| 10,241,546 | B2 | 3/2019 | Lu et al. |
| 2011/0296333 | A1 | 12/2011 | Bateman et al. |
| 2014/0154987 | A1* | 6/2014 | Lee .................. H04W 4/80 |
| | | | 455/41.2 |
| 2014/0191994 | A1* | 7/2014 | Chung .............. G06F 3/0488 |
| | | | 345/173 |

FOREIGN PATENT DOCUMENTS

| CN | 102262504 A | 11/2011 |
| CN | 102467330 A | 5/2012 |

(Continued)

*Primary Examiner* — Gustavo Polo
(74) *Attorney, Agent, or Firm* — McClure, Qualey & Rodack, LLP

(57) ABSTRACT

An electronic device is provided in disclosure. The electronic device includes a processor and a plurality of touch displays. The touch display is electrically connected to the processor, the touch display including: a touch detection unit and a touch processing unit. The touch detection unit is configured to detect a touch operation and generate a touch signal, and the touch processing unit is electrically connected to the touch detection unit for receiving the touch signal. The touch detection unit is configured to transmit the touch signal to the touch processing unit or the processor. The electronic device reduces a burden of the processor and enhances efficiency of the processor.

9 Claims, 15 Drawing Sheets

(56) References Cited

FOREIGN PATENT DOCUMENTS

| | | | |
|---|---|---|---|
| CN | 103345312 | A | 10/2013 |
| CN | 103430137 | A | 12/2013 |
| CN | 203386107 | U | 1/2014 |
| CN | 103914646 | A | 7/2014 |
| CN | 103970320 | A | 8/2014 |
| CN | 104536605 | A | 4/2015 |
| CN | 103500063 | B | 8/2016 |
| CN | 106200778 | A | 12/2016 |
| CN | 107741760 | A | 2/2018 |
| EP | 2851779 | A1 | 3/2015 |

* cited by examiner

1800

1900

ELECTRONIC DEVICE WITH TOUCH PROCESSING UNIT

CROSS-REFERENCE TO RELATED APPLICATION

This application claims the priority benefit of U.S. Provisional Application Ser. No. 62/703,900, filed on Jul. 27, 2018 and Taiwan application serial No. 108115609, filed on May 6, 2019. The entirety of the above-mentioned patent application is hereby incorporated by reference herein and made a part of the specification.

TECHNICAL FIELD

The disclosure relates to an electronic device, and in particular, to an electronic device having a dual-touch screen.

BACKGROUND OF THE INVENTION

As touch screens are widely used on mobile devices, notebook computer also conducts with touch screens as display apparatuses to enhance user experience and meet use requirements. A dual-touch screen notebook computer usually uses a touch screen instead of a keyboard and a touchpad, and therefore needs to switch between a touch screen function (a touch mode) and a touchpad function (a mouse mode).

SUMMARY OF THE INVENTION

The disclosure is intended to provide an electronic device reducing a burden of a processor and enhancing efficiency of the processor.

According to one aspect of the disclosure, an electronic device is provided herein. The electronic device includes: a processor; and a plurality of touch displays electrically connected to the processor, the plurality of touch displays comprising: a touch detection unit, configured to detect a touch operation to generate a touch signal; and a touch processing unit electrically connected to the touch detection unit for receiving the touch signal; wherein the touch detection unit is configured to transmit the touch signal to the touch processing unit or the processor.

The electronic device of the disclosure mainly processes some touch determining and performing of mode switch via a touch IC, so as to reduce the burden of the processor and enhance the efficiency of the processor.

DETAILED DESCRIPTION OF THE EMBODIMENTS

A plurality of embodiments or examples is provided in the following to implement different features of the disclosure. Elements and configurations in special examples are used to simplify the disclosure in the following discussions. Any discussed examples are merely used for illustrative purposes, and are not intended to limit the scope and meanings of the disclosure or examples thereof in any way. In addition, numeric symbols and/or letters are repeatedly cited in different examples of the disclosure, and the repetitions are all used for simplification and explanations and do not specify relationships between different embodiments and/or configurations in the following discussions.

Figure 1:
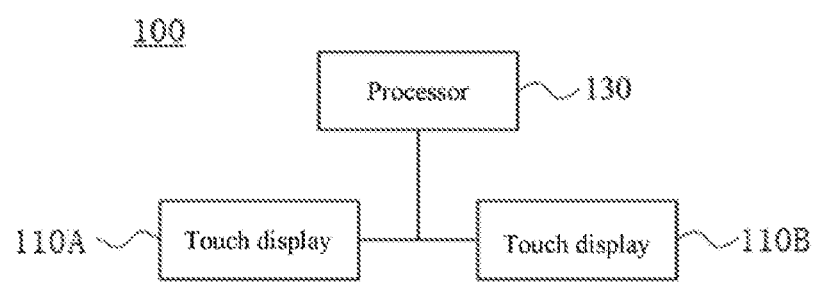
FIG. 1 is a schematic diagram of an electronic device according to some embodiments of the disclosure.
Figure 2:
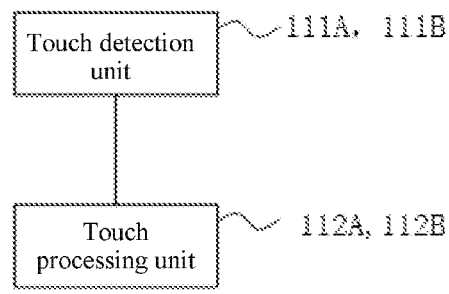
FIG. 2 is a schematic diagram of a touch display according to some embodiments of the disclosure.

Refer to FIG. 1 and FIG. 2 together. FIG. 1 is a schematic diagram of an electronic device 100 according to some embodiments of the disclosure, and FIG. 2 is a schematic diagram of touch displays 110A and 110B according to some embodiments of the disclosure. As shown in FIG. 1, the electronic device 100 includes touch displays 110A and 110B and a processor 130. The processor 130 is electrically connected with the touch displays 110A and 110B. As shown in FIG. 2, the touch displays 110A and 110B include touch detection units 111A, 111B and touch processing units 112A, 112B. The touch detection unit 111A is electrically connected with the touch processing unit 112A, and the touch detection unit 111B is electrically connected with the touch processing unit 112B.

In an embodiment, the processor 130 is an integrated circuit such as a microcontroller, a microprocessor, a digital signal processor, an application specific integrated circuit (ASIC), a logic circuit, or other similar elements or a combination of the foregoing elements. The touch displays 110A and 110B include a finger signal detection capability or a pressure sensing capability. In an embodiment, the touch processing units 112A, 112B are implemented by a touch IC.

Figure 3:
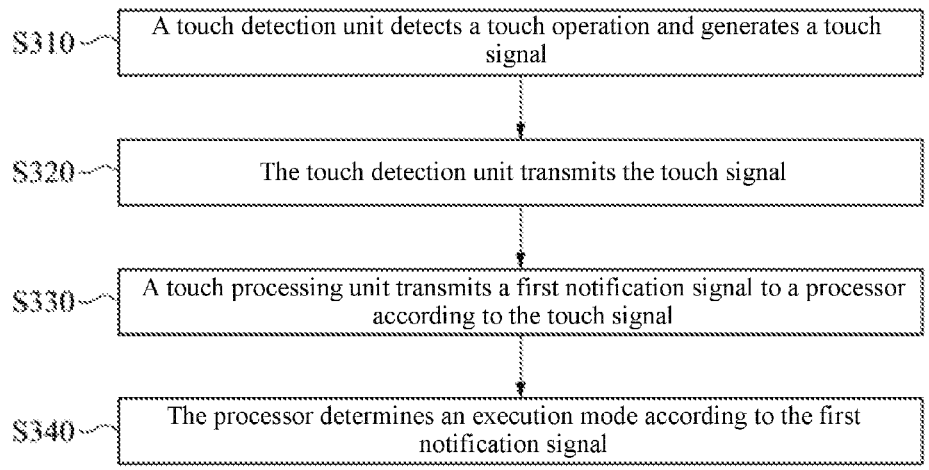
FIG. 3 is a flowchart of a control method according to some embodiments of the disclosure.

Refer to FIG. 3. FIG. 3 is a flowchart of a control method 300 according to some embodiments of the disclosure. In an embodiment, the control method 300 shown in FIG. 3 is applied to the electronic device 100 in FIG. 1, and the touch displays 110A and 110B and the processor 130 are configured to switch execution modes of the touch displays 110A and 110B according to the following steps described in the control method 300.

In an embodiment, the touch displays 110A and 110B include similar hardware apparatuses. The touch detection unit 111A and the touch processing unit 112A in the touch display 110A are used as an example herein. The touch detection unit 111B and the touch processing unit 112B also include similar operations, and details are not described herein again. In the step S310 of the control method 300, the touch detection unit 111A detects a touch operation and generates a touch signal. In the step S320 of the control method 300, the touch detection unit 111A transmits the touch signal.

Figure 4A:
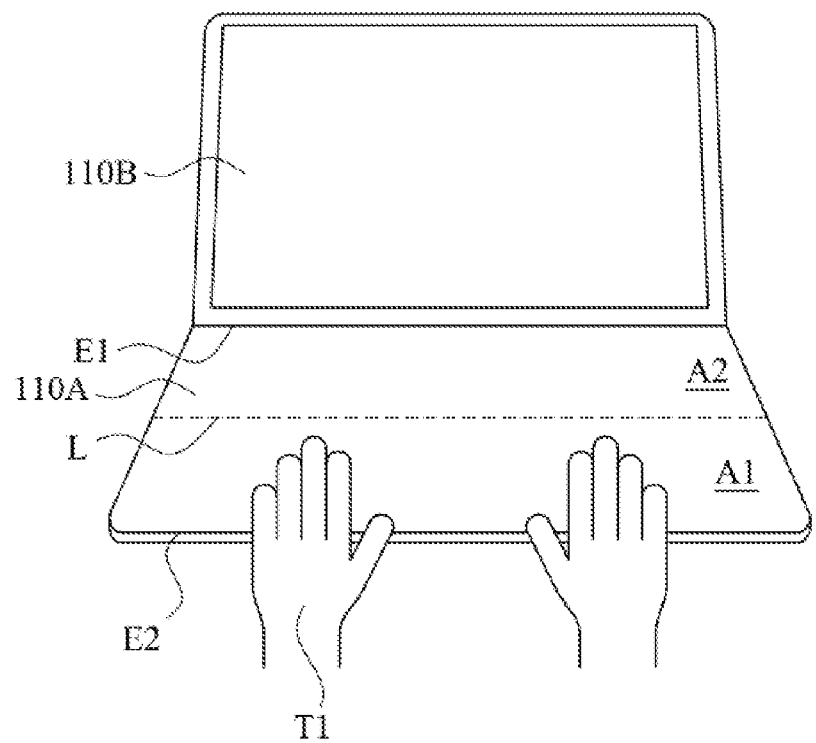
FIG. 4A is a schematic diagram of a touch operation according to some embodiments of the disclosure.

Referring to FIG. 4A, in an embodiment, a current execution mode of the touch display 110A is preset to a touch screen mode. In this embodiment, the entire touch display 110A is in the touch screen mode. When a user touches an execution area A1 of the touch display 110A with eight fingers and the touch detection unit 111A of the touch display 110A detects a touch operation T1 (that is, detecting a finger signal of the 8 fingers in the execution area A1) of the user, the touch detection unit 111A generates a touch signal execution area and transmits the touch signal to the touch processing unit 112A.

Next, in the step S330 of the control method 300, the touch processing unit 112A transmits a first notification signal to the processor 130 according to the touch signal received from the touch detection unit 111A, and in the step S340 of the control method 300, the processor 130 determines an execution mode according to the first notification signal. In an embodiment, referring to FIG. 4A, FIG. 4A is a schematic diagram of an execution mode according to some embodiments of the disclosure. While receiving the touch signal, the touch processing unit 112A transmits the first notification signal to the processor 130. In this case, the first notification signal is configured to notify the processor 130 of the touch operation T1 detected by the touch detection unit 111A.

Figure 5:
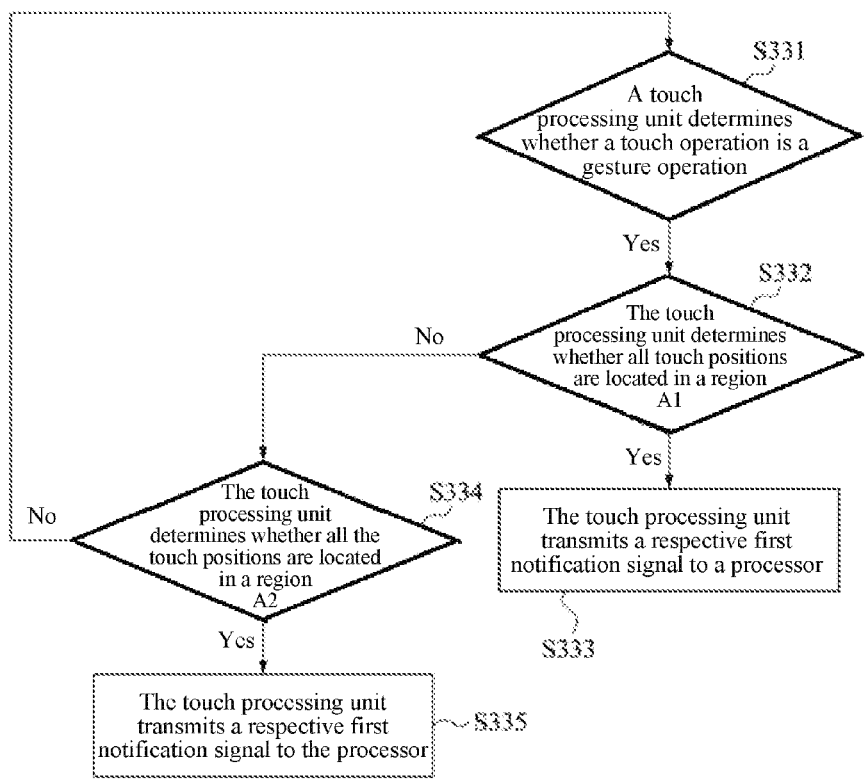
FIG. 5 is a flowchart of step S330 according to some embodiments of the disclosure.

As described above, refer to FIG. 5. FIG. 5 is a flowchart of step S330 according to an embodiment of the disclosure. Following the foregoing embodiment, in the step S331 of the control method 300, the touch processing unit 112A determines whether the touch operation T1 is a gesture operation. In an embodiment, the gesture operation is a multi-finger touch (shown in FIG. 4A). Next, in the step S332 of the control method 300, the touch processing unit 112A determines whether the touch operation T1 includes a plurality of touch positions (TP) corresponding to the multi-finger touch and determines whether all these touch positions (TP) are located in the execution area (a first execution area) A1. When it is determined that all these touch positions (TP) are located in the execution area A1, the step S333 of the control method 300 is executed. In the step S333, the touch processing unit 112A transmits the first notification signal corresponding to the gesture operation to the processor 130. Next, in the step S340 of the control method 300, the processor 130 determines an execution mode according to the first notification signal.

Figure 4B:
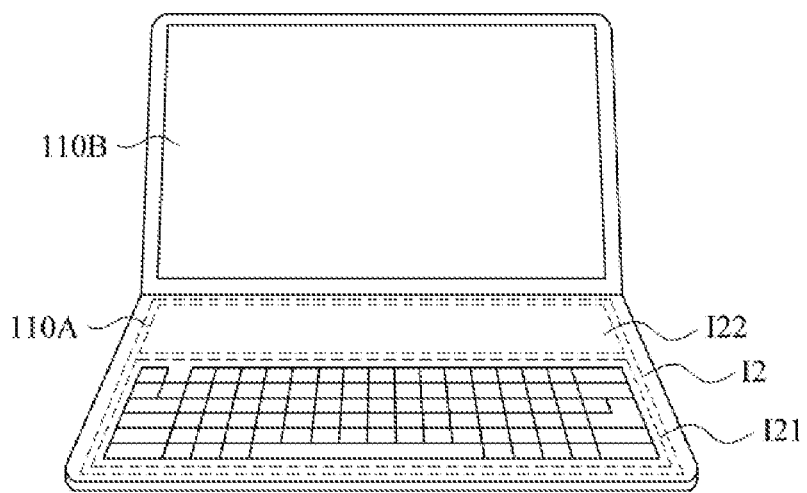
FIG. 4B is a schematic diagram of an execution mode according to some embodiments of the disclosure.

As shown in FIG. 4A and FIG. 4B, when all these touch positions (TP) are located in the execution area A1, the processor 130 determines and executes an execution mode corresponding to the execution area A1 (in an embodiment, the processor 130 controls the touch display 110A to display an interface setting corresponding to the touch operation T1 of the eight fingers located in the execution area A1). In this embodiment, an application program executed by the processor 130 controls the touch display 110A to display an interface I2. The interface I2 includes a first sub-interface I21 and a second sub-interface I22. In an embodiment, the first sub-interface I21 is a virtual keyboard, and the second sub-interface I22 is a touch display screen. In this case, a touch signal received from the interface I2 is determined as a touch screen operation.

In an embodiment, ranges of the execution area A1 and the execution area A2 shown in FIG. 4A are determined by a separation line L. In an embodiment, a smaller distance between the separation line L and an edge E1 brings a larger range of the execution area A1 and a smaller range of the execution area A2, and a smaller distance between the separation line L and an edge E2 brings a larger range of the execution area A2 and a smaller range of the execution area A1.

Figure 6:
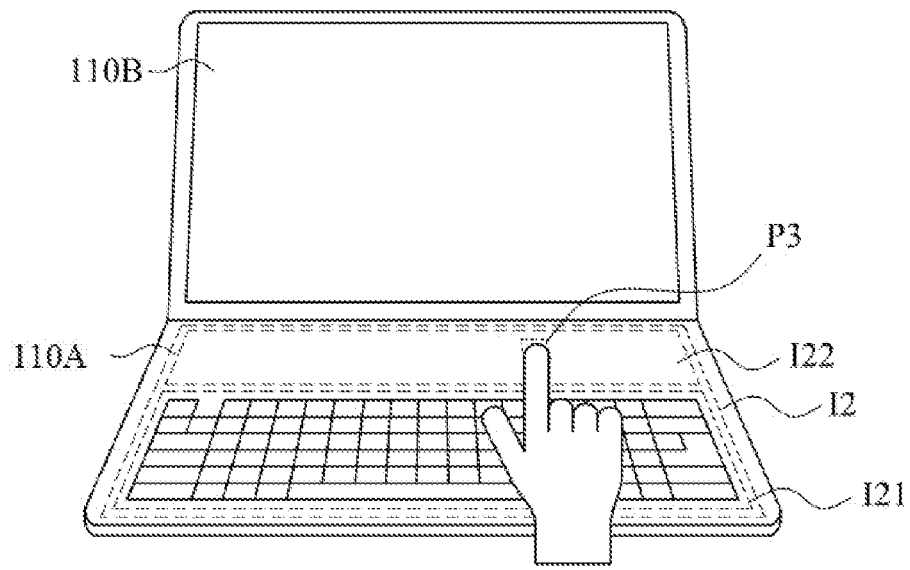
FIG. 6 is a schematic diagram of an execution mode according to some embodiments of the disclosure.

As shown in FIG. 6, in this embodiment, an execution mode of the second sub-interface I22 displayed on the touch display 110A is a touch screen mode. When a touch operation is that a user touches a functional icon located at a position P3 of the second sub-interface I22, a function of the functional icon is triggered. In the touch screen mode, a touch signal received by the touch processing unit 112A from the second sub-interface I22 displayed on the touch display 110A includes absolute position information of the touch operation, and the touch processing unit 112A triggers the function of the functional icon according to the absolute position information (in an embodiment, the position P3).

Figure 7:
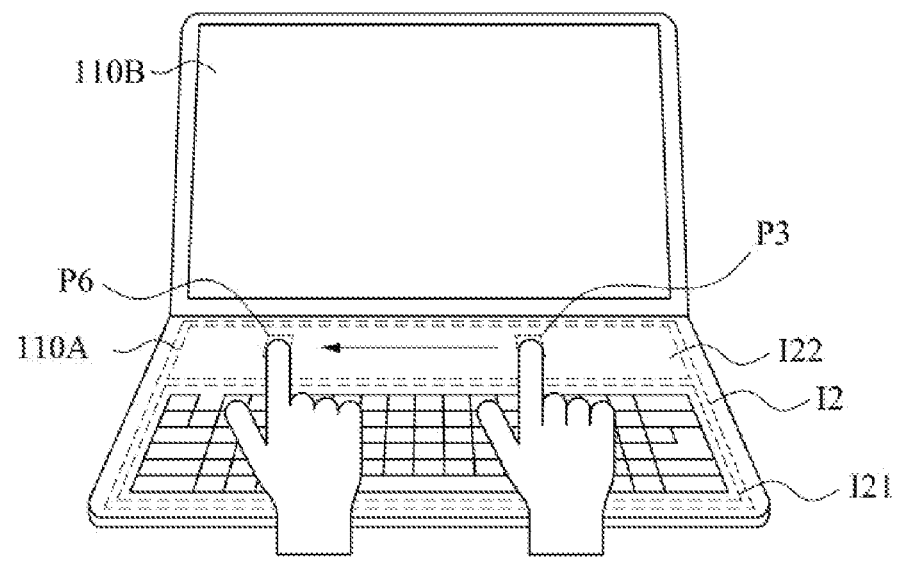
FIG. 7 is a schematic diagram of an execution mode according to some embodiments of the disclosure.

As shown in FIG. 7, in an embodiment, when the touch operation is that a user drags the functional icon located at the position P3 of the touch display 110A to a position P6 of the touch display 110A and the execution mode is also a touch screen mode, the touch processing unit 112A moves the functional icon located on the position P3 to the position P6 according to absolute position information (in the embodiment, displacement information from the position P3 to the position P6).

Figure 8:
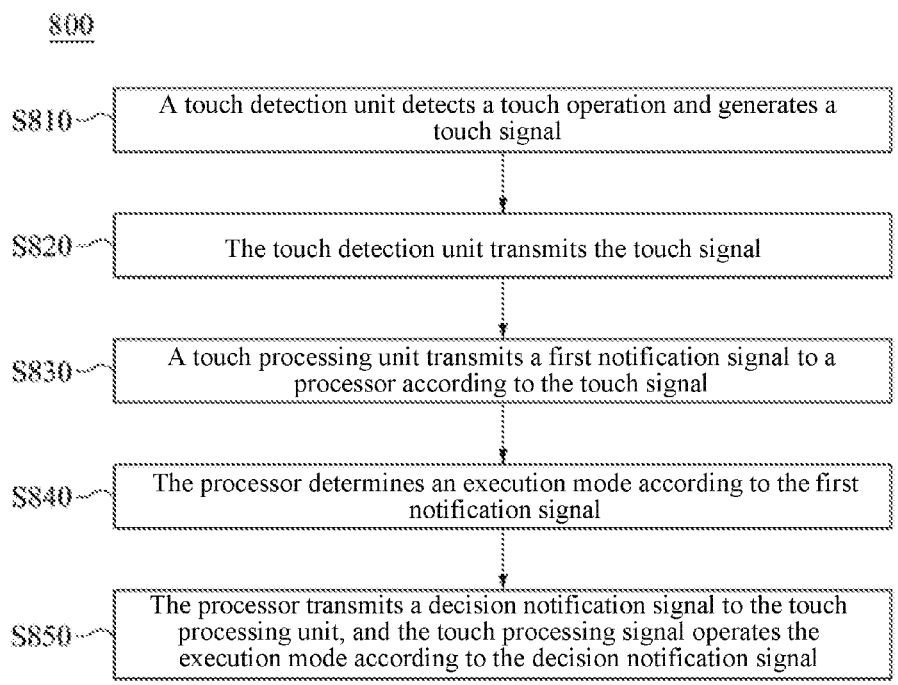
FIG. 8 is a flowchart of a control method according to some embodiments of the disclosure.

Refer to FIG. 8. FIG. 8 is a flowchart of a control method 800 according to some embodiments of the disclosure. In another embodiment, the control method 800 shown in FIG. 8 is applied to the electronic device 100 in FIG. 1. The touch displays 110A and 110B and the processor 130 are configured to perform the steps S810~S850 of the control method 800 described as follow. In the step S810, the touch detection unit 111A detects a touch operation and generates a touch signal. In the step S820, the touch detection unit 111A transmits the touch signal.

Figure 9A:
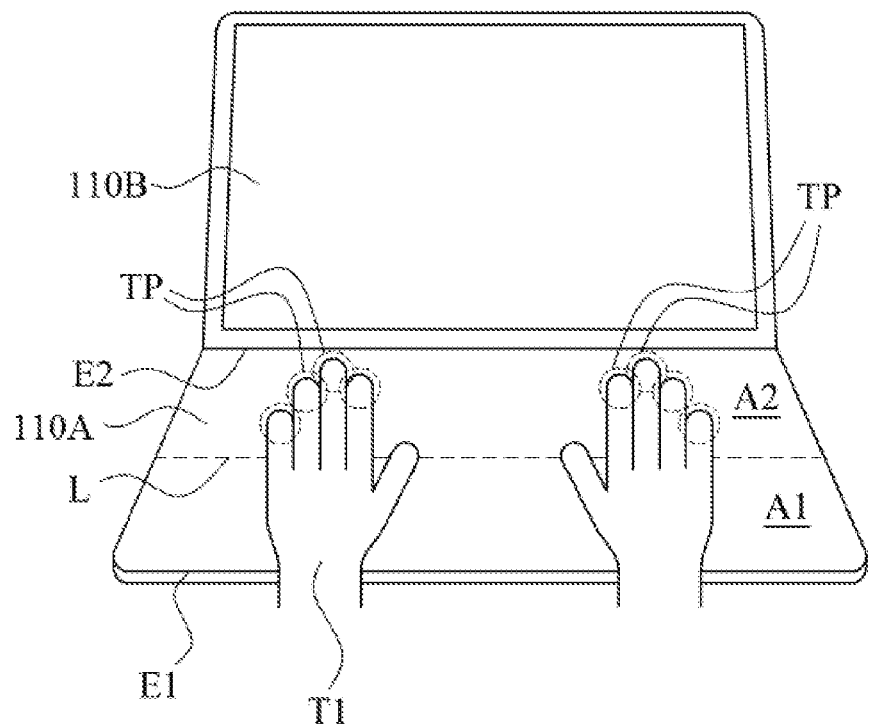
FIG. 9A is a schematic diagram of a touch operation according to some embodiments of the disclosure.

Referring to FIG. 9A, FIG. 9A is a schematic diagram of a touch operation according to some embodiments of the disclosure. As shown in FIG. 9A, a current execution mode of the touch display 110A is preset to a touch screen mode. In this embodiment, the entire touch display 110A is in the touch screen mode. When a user touches an execution area A2 of the touch display 110A with eight fingers, the touch detection unit 111A of the touch display 110A generates a touch signal after detecting a touch operation T1 (that is, detecting finger signals of the 8 fingers in the execution area A2) of the user, and transmits the touch signal to the touch processing unit 112A.

Next, in the step S830, the touch processing unit 112A transmits a first notification signal to the processor 130 according to the touch signal, and in step S840, the processor 130 determines an execution mode according to the first notification signal. In an embodiment, referring to FIG. 9A, FIG. 9A is a schematic diagram of an execution mode according to some embodiments of the disclosure. While receiving the touch signal, the touch processing unit 112A transmits the first notification signal to the processor 130. In this case, the first notification signal is configured to notify the processor 130 that the user's touch operation T1 detected by the touch detection unit 111A.

As described above, referring to FIG. 10, FIG. 10 is a flowchart of step S830 according to an embodiment of the disclosure. Following the foregoing embodiment, in step S831 of the control method 800, the touch processing unit 112A determines whether the touch operation T1 is a gesture operation. In an embodiment, the gesture operation is a multi-finger touch (shown in FIG. 9A). In the step 832 of the control method 800, the touch processing unit 112A determines whether the touch operation T1 includes a plurality of touch positions (TP) corresponding to a plurality of fingers, and determines whether all these touch positions (TP) are located in the execution area (a first execution area) A1. When the touch processing unit 112A determines that not all these touch positions (TP) are located in the execution area A1, the step S834 of the control method 800 is executed. In the step S834, the touch processing unit 112A determines whether all these touch positions (TP) are located in the execution area (a second execution area) A2. When all these touch positions (TP) all are located in the execution area A2, the step S835 of the control method 800 is executed. In the step S835 the touch processing unit 112A transmits the first notification signal to the processor 130. Next, in the step S840 of the control method 800, the processor 130 determines an execution mode according to the first notification signal.

In an embodiment, when the processor 130 determines the execution mode, the step 850 of the control method 800 is executed. the processor 130 transmits a decision notification signal to the touch processing unit 112A. Next, the touch processing unit 112A performs, according to the decision notification signal, the execution mode determined by the processor 130.

Figure 9B:
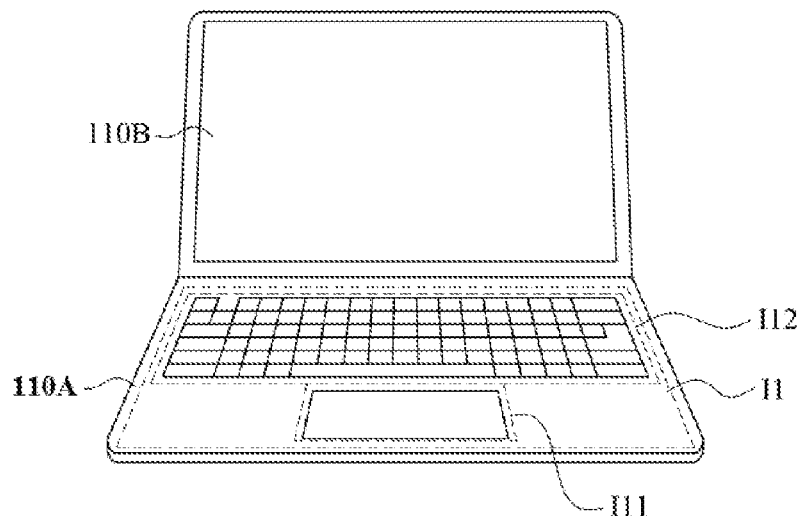
FIG. 9B is a schematic diagram of an execution mode according to some embodiments of the disclosure.

Referring to FIG. 9A and FIG. 9B, when the touch operation T1 is located in the execution area A2, the processor 130 controls the touch display 110A to display an interface setting corresponding to the touch operation T1 of the eight fingers located in the execution area A2. In an embodiment, an application program executed by the processor 130 controls the touch display 110A to display an interface I1. The interface I1 includes a first sub-interface I11 and a second sub-interface I12, the first sub-interface I11 being a touchpad and the second sub-interface I12 being a virtual keyboard.

In addition, the processor 130 transmits a decision notification signal to the touch processing unit 112A for ordering the touch processing unit 112A to switch an execution mode of an execution area corresponding to the first sub-interface I11 in the touch display 110A to a touchpad mode, and maintains an execution mode of the execution area corresponding to the second sub-interface I12 in the touch display 110A is as a touch screen mode. In this way, a touch signal received from the first sub-interface I11 is determined as a mouse operation, and a touch signal received from the second sub-interface I12 is determined as a general touch operation.

In an embodiment, ranges of the execution area A1 and the execution area A2 shown in FIG. 9A are determined using a separation line L. In an embodiment, a smaller distance between the separation line L and an edge E2 brings a larger range of the execution area A1 and a smaller range of the execution area A2, and a smaller distance between the separation line L and an edge E1 brings a larger range of the execution area A2 and a smaller range of the execution area A1.

Figure 11:
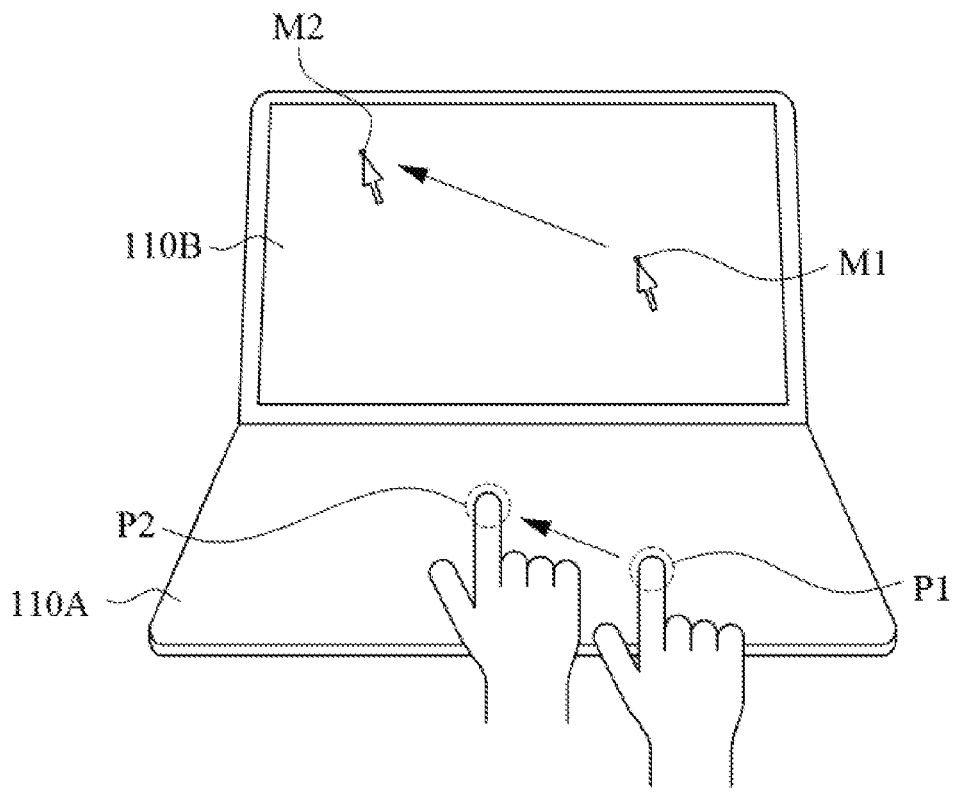
FIG. 11 is a schematic diagram of an execution mode according to some embodiments of the disclosure.

In this embodiment, the processor 130 transmits a decision notification signal to the touch processing unit 112A for ordering the touch processing unit 112A to switch the execution mode of the entire touch display 110A to the touchpad mode. As shown in FIG. 11, when a touch operation of a user moves from a position P1 of the touch display 110A to a position P2, a mouse moves from a position M1 of the touch display 110B to a position M2. In the touchpad mode, a touch signal received by the touch processing unit 112A from the touch display 110A includes position information of the touch operation, and the touch processing unit 112A converts the position information (in an embodiment, positions P1, P2) of the touch operation on the touch display 110A to relative position information (in an embodiment, positions M1, M2) on the touch display 110B, and instructs the processor 130 to control the touch display 110B to display a mouse movement from the position M1 to the position M2 according to the relative information (in an embodiment, the positions M1, M2).

Figure 12:
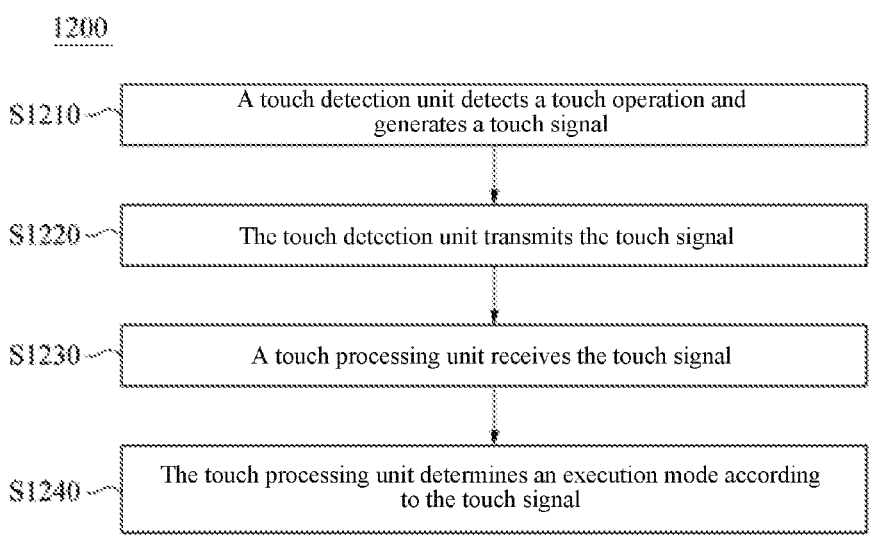
FIG. 12 is a flowchart of a control method according to some embodiments of the disclosure.

Refer to FIG. 12. FIG. 12 is a flowchart of a control method 1200 according to some embodiments of the disclosure. In another embodiment, the control method 1200 shown in FIG. 12 is applied to the electronic device 100 in FIG. 1, and the touch displays 110A and 110B and the processor 130 are configured to switch execution modes of touch displays 110A and 110B according to the following steps described in the control method 1200. In this embodiment, steps S1210-S1220 are the same as steps S310-S320, and details are not described herein again.

Figure 13:
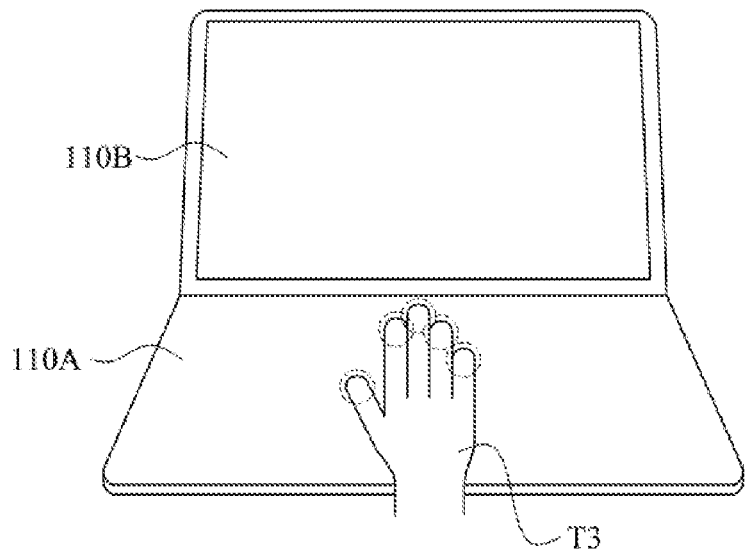
FIG. 13 is a schematic diagram of a touch operation according to some embodiments of the disclosure.

As described above, in the step S1230 of the control method 1200, the touch processing unit 112A receives a touch signal. Then, in step S1240, the touch processing unit 112A determines an execution mode according to the touch signal. In this embodiment, the touch processing unit 112A directly determines, according to the touch signal, whether to switch the execution mode. Referring to FIG. 13, in this embodiment, a current execution mode of the touch display 110A is preset to a touch screen mode. When a user touches any area of the touch display 110A with five fingers, the touch detection unit 111A of the touch display 110A generates a touch signal while detecting a touch operation T3 (that is, detecting a finger signal of the 5 fingers) of the user, and transmits the touch signal to the touch processing unit 112A. Next, the touch processing unit 112A switches the execution mode of the touch display 110A from the touch screen mode to a touchpad mode according to the touch signal.

In an embodiment, when the touch processing unit 112A does not receive another touch signal after receiving the touch signal for a specific time duration, the touch processing unit 112A switches the execution mode again (in this embodiment, the execution mode is switched back the touch screen mode from the touchpad mode). In this embodiment, the execution mode includes the touch screen mode and the touchpad mode.

Figure 10:
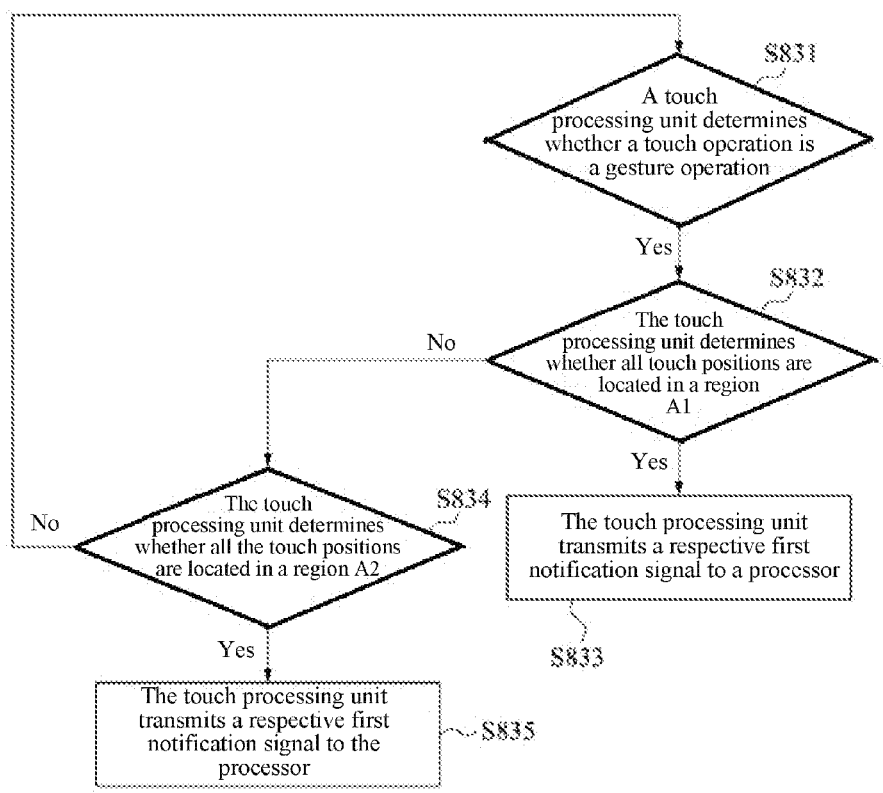
FIG. 10 is a flowchart of step S830 according to some embodiments of the disclosure.
Figure 14:
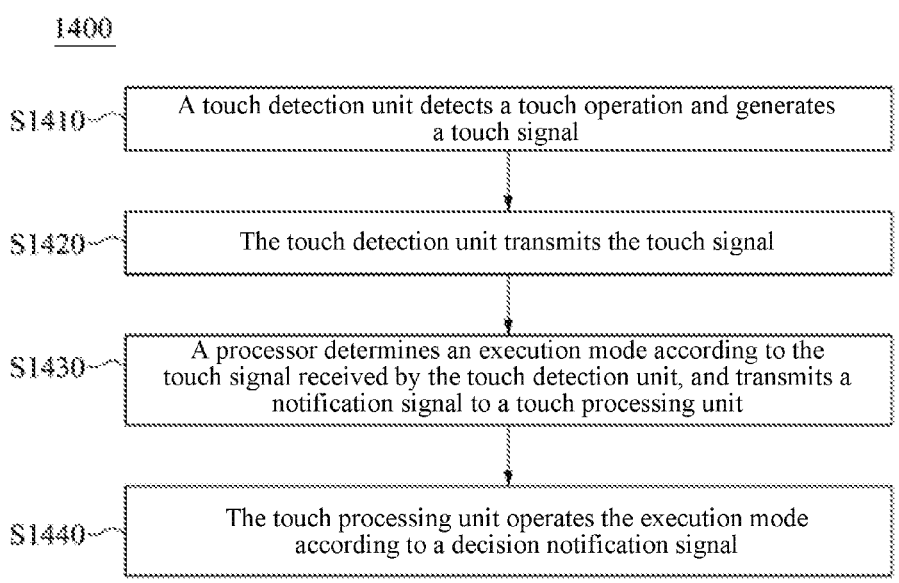
FIG. 14 is a flowchart of a control method according to some embodiments of the disclosure.

Referring to FIG. 14, FIG. 14 is a flowchart of a control method 1400 according to some embodiments of the disclosure. In one embodiment, the control method 1400 shown in FIG. 10 is applied to the electronic device 100 in FIG. 1, and the touch displays 110A and 110B and the processor 130 are configured to determine execution modes of the touch displays 110A and 110B according to the following steps of the control method 1400. In the step S1410 of the control method 1400, the touch detection unit 111A detects a touch operation and generates a touch signal, and in the S1420 of the control method 1400, the touch detection unit 111A transmits the touch signal to the processor 130.

As described above, in step S1430 of the control method 1400, the processor 130 determines an execution mode according to the touch signal received from the touch detection unit 111A to generate a decision notification signal and transmits the decision notification signal to the touch processing unit 112A. Next, in the step S1440 of the control method 1400, the touch processing unit 112A performs the execution mode according to the decision notification signal.

Referring to FIG. 4A, a ranges of the execution area A1 and the execution area A2 of the touch display 110B are determined by a separation line L, and then the execution modes of the execution area A1 and the execution area A2 are determined. In an embodiment, the processor 130 determines whether to perform at least one of a system mode or an application mode according to a touch signal received from the touch detection unit 111A or 111B. (in an embodiment, a virtual button) on the touch display 110A or 110B. When determining that an execution mode of the execution area A1 is an application mode and an execution mode of the execution area A2 is a system mode, the processor 130 transmits a corresponding decision notification signal to the touch processing unit 112A. Next, the touch processing unit 112A sets the execution mode of the execution area A1 to the application mode and the execution mode of the execution area A2 to the system mode according to the decision notification signal.

In this embodiment, touch information of the execution area A1 with the application mode is transmitted to a specific application program executed by the processor, and an operating system executed by the processor does not receive these touch information from the execution area A1 with the application mode. Touch information of the execution area A2 with the system mode is transmitted to the operating system executed by the processor, and the operating system determines whether to perform further processing according to the touch information after receiving the touch information from the execution area A2 with the system mode.

As described above, in another embodiment, a detection signal received by at least one motion sensing unit (in an embodiment, a motion sensing unit 1810 in FIG. 18) located at a periphery of the touch display 110A or 110B is used to determine whether at least one of the system mode or application mode is to be performed. In an embodiment, the motion sensing unit is a physical button or a magnetic sensor.

Figure 15:
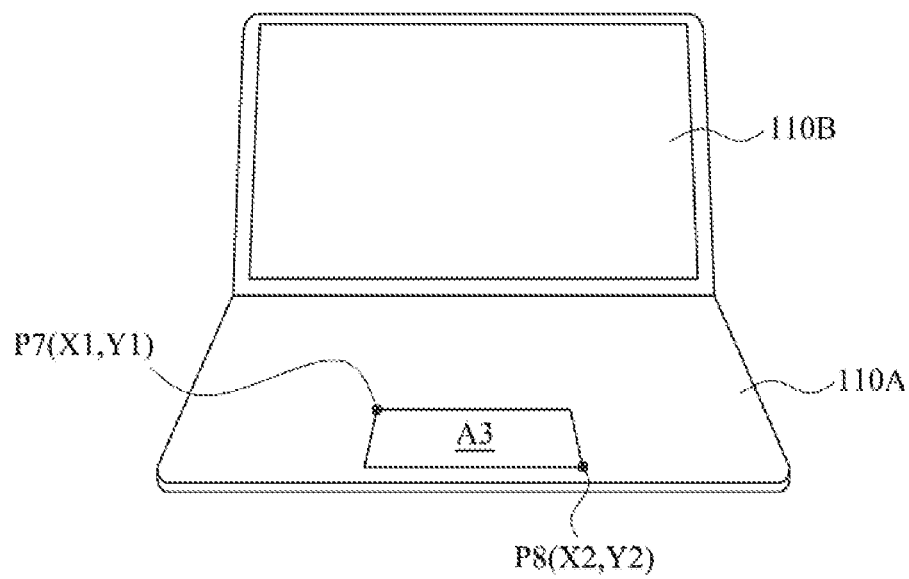
FIG. 15 is a schematic diagram of an execution mode according to some embodiments of the disclosure.

Referring to FIG. 15, in an embodiment, the processor 130 determines an execution mode (in an embodiment, a touchpad mode) and an execution area of the execution mode according to a touch signal received from the touch display 110A or 110B. Next, the processor 130 transmits a decision notification signal including execution area setting information of the determined execution mode to the touch processing unit 112A, and the touch processing unit 112A adjusts an area of the execution area and the execution mode in the touch display 110A according to the execution area setting information. As shown in FIG. 15, in an embodiment, the execution area setting information is coordinate information of a range of an execution area A3, and the range of the execution area A3 is defined by coordinate (X1, Y1) corresponding to a position P7 and coordinate (X2, Y2) corresponding to a position P8 of the touch display 110A. The touch processing unit 112A adjusts the execution mode of the execution area A3 in the touch display 110A to a touchpad mode according to the decision notification signal.

Figure 16:
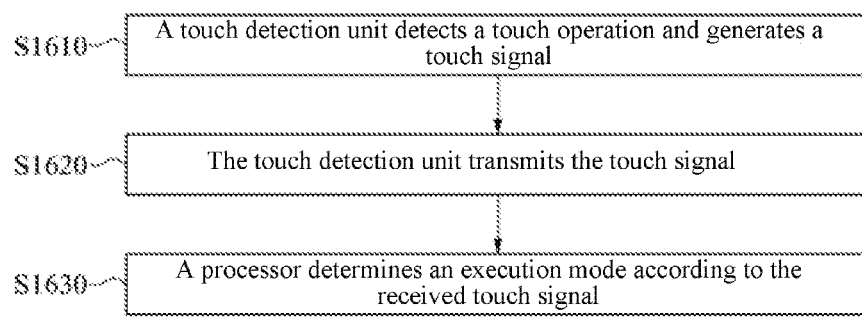
FIG. 16 is a flowchart of a control method according to some embodiments of the disclosure.

As described above, referring to FIG. 16, FIG. 16 is a flowchart of a control method 1600 according to some embodiments of the disclosure. In another embodiment, the control method 1600 shown in FIG. 16 is applied to the electronic device 100 in FIG. 1, and the touch displays 110A and 110B and the processor 130 are configured to switch execution modes of touch displays 110A and 110B according to the following steps of the control method 1600. In this embodiment, steps S1610-S1620 are the same as steps S310-S320, and details are not described herein again. As described above, in the control method 1600, step S1630 in which the processor 130 determines the execution mode according to a touch signal received from the touch detection unit 111A.

As described above, referring to FIG. 17A, in this embodiment, when a user performs a touch operation T21 on the touch display 110A (that is, the user's finger slides from a position P9 of the touch display 110A to a position P10 of the touch display 110A), the touch detection unit 111A of the touch display 110A generates a touch signal according to the detected touch operation T21 and transmits the touch signal to the processor 130.

Figure 17A:
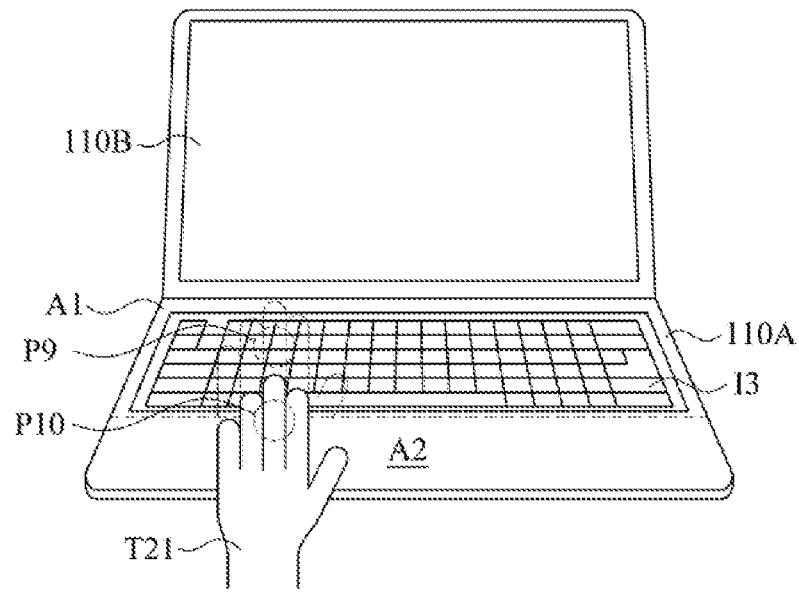
FIG. 17A is a schematic diagram of a touch operation according to some embodiments of the disclosure.
Figure 17B:
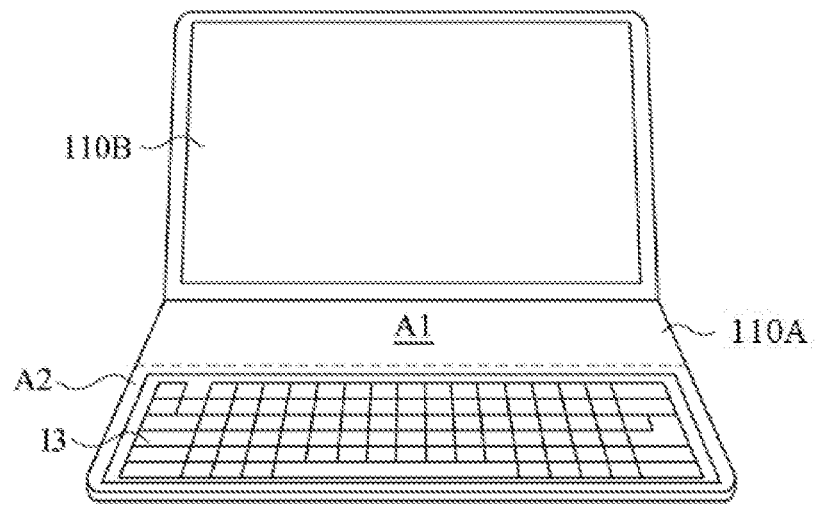
FIG. 17B is a schematic diagram of a touch operation according to some embodiments of the disclosure.

As shown in FIG. 17A and FIG. 17B, the processor 130 determines whether the touch operation T21 conforms to a gesture operation according to the touch signal. In this embodiment, the gesture operation is a sliding touch. When the touch operation T21 conforms to the sliding touch, the processor 130 determines to adjust a current execution mode to another execution mode. When the touch operation T21 does not conform to the sliding touch, the current execution mode is maintained. In this embodiment, when the processor 130 determines that the touch operation T21 is a sliding touch, the processor 130 controls the touch display 110A to move an interface 13 displayed on an execution area A1 to an execution area A2 (shown in FIG. 17B).

Figure 18:
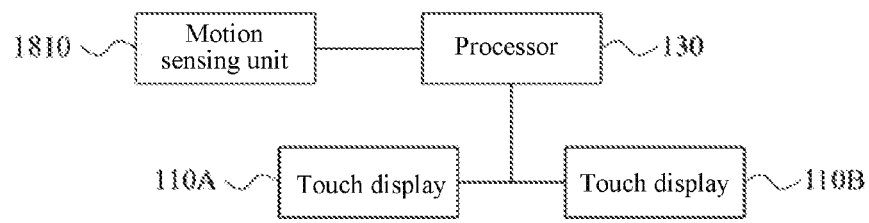
FIG. 18 is a schematic diagram of an electronic device according to some embodiments of the disclosure.

Referring to FIG. 18, an electronic device 1800 includes touch displays 110A and 110B, a processor 130, and a motion sensing unit 1810. The processor 130 is electrically connected to the touch displays 110A, 110B and the motion sensing unit 1810. In an embodiment, the motion sensing unit 1810 is at least one of a magnetic sensor, a light sensor, a pressure sensor, or a physical button.

Figure 19:
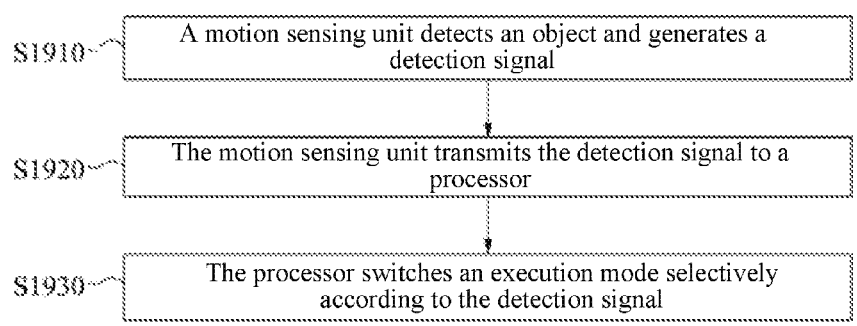
FIG. 19 is a flowchart of a control method according to some embodiments of the disclosure.

Referring to FIG. 19, FIG. 19 is a flowchart of a control method 1900 according to some embodiments of the disclosure. In another embodiment, the control method 1900 shown in FIG. 19 is applied to the electronic device 1800 in FIG. 18, and the touch displays 110A and 110B, the processor 130, and a plurality of motion sensing units 1810 are configured to switch an execution mode of the touch display 110A or 110B according to the following steps of the control method 1900.

Figure 20:
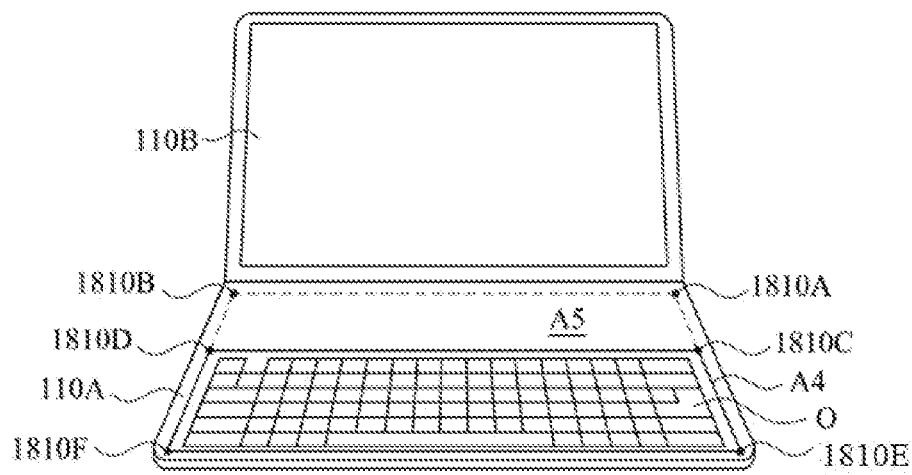
FIG. 20 is a schematic diagram of an execution mode according to some embodiments of the disclosure.

In an embodiment, in the step S1910 of the control method 1900, the motion sensing unit 1810 detects an object O (in an embodiment, a physical keyboard) and generates a detection signal, and the motion sensing unit 1810 transmits a detection signal to the processor 130 in the step S1920 of the control method 1900. Referring to FIG. 20, the electronic device 1800 includes a plurality of motion sensing units 1810A-1810F. When an object O approaches the motion sensing units 1810C-1810F, the motion sensing units 1810C-1810F transmit detection signals to the processor 130. Next, in the step S1930 of the control method 1900, the processor 130 determines an execution mode according to the detection signals. While receiving the detection signals from the motion sensing unit 1810C-1810F, the processor 130 determines a position of the object O according to the detection signals (in an embodiment, the object O is located in an execution area A4 of the touch display 110B), and then controls the touch display 110A to maintain the execution area A5 as a touch display screen.

Figure 21:
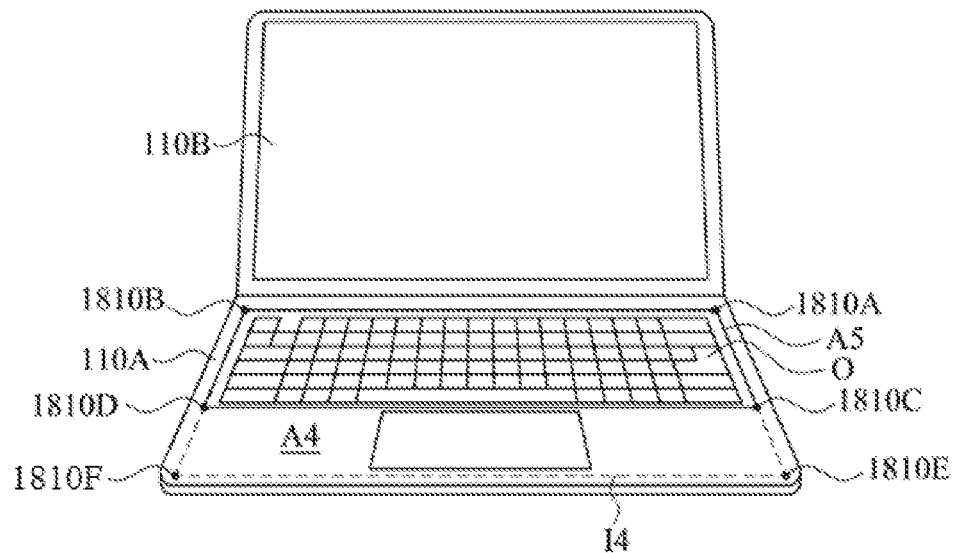
FIG. 21 is a schematic diagram of a touch operation according to some embodiments of the disclosure.

Referring to FIG. 21, when the motion sensing units 1810A-1810D detect that an object O is approaching (step S1910), the motion sensing units 1810A-1810D transmit respective detection signals to the processor 130 (step S1920). In the step S1930 of the control method 1900, the processor 130 determines a position of the object O according to the detection signals received from the motion sensing units 1810A-1810D (in an embodiment, the object O is located in an execution area A5 of the touch display 110B), to determine an execution mode (in an embodiment, controlling the touch display 110A to display a interface I4 on an execution area A4 such as a virtual touchpad), and then the processor 130 generate a decision notification signal corresponding to the execution mode and transmits the decision notification signal to a touch processing unit 112A. Then, the touch processing unit 112A adjusts an execution area of the interface I4 in the touch display 110A to be in a touchpad mode according to the decision notification signal.

Figure 22:
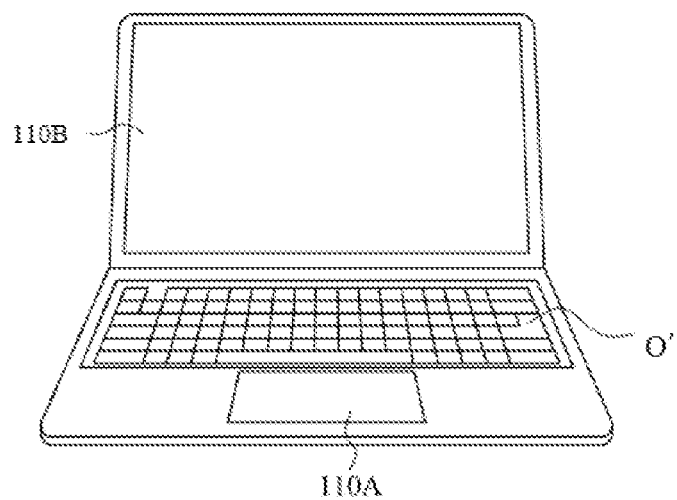
FIG. 22 is a schematic diagram of an electronic device according to some other embodiments of the disclosure.

Referring to FIG. 22, a main difference between an electronic device in this embodiment and the electronic device 100 in the foregoing embodiment is that the electronic device in FIG. 22 includes touch displays 110A and 110B with different sizes or resolution ratios and an input element O' (in an embodiment, a physical keyboard). In this embodiment, execution modes of the touch displays 110A and 110B is switched or adjusted according to various foregoing control methods. In addition, the execution modes of the touch displays 110A and 110B in this embodiment are roughly the same as the execution modes mentioned in the foregoing embodiments.

As mentioned above, since the touch processing unit such as touch IC can determine some touch operation and switch execution modes, so as to reduce a burden of the processor and enhance efficiency of the processor.

In addition, although the foregoing examples contain sequential exemplary steps, the steps do not need to be executed according to the shown sequences. The execution of the steps according to different sequences falls within content of the disclosure. The steps are added, replaced and/or deleted or the sequences of the steps are changed as required within the spirit and scope of the embodiments of the disclosure.

Although the disclosure is disclosed by using the embodiments in the foregoing descriptions, the embodiments are not intended to limit the disclosure. Any persons of ordinary skill in the art make some modifications and improvements without departing from the spirit and scope of the disclosure. Therefore, the protection scope of the disclosure is subject to the claims.

What is claimed is:

1. An electronic device, comprising:
   a processor; and
   a plurality of touch displays electrically connected to the processor, the plurality of touch displays comprising:
      a touch detection unit, configured to detect a touch operation to generate a touch signal; and
      a touch processing unit electrically connected to the touch detection unit for receiving the touch signal;
   wherein the touch detection unit is configured to transmit the touch signal to the touch processing unit or the processor,
   wherein when the touch signal is transmitted to the touch processing unit, the touch processing unit transmits a first notification signal to the processor according to the touch signal, and the processor determines an execution mode according to the first notification signal,
   wherein the processor generates a decision notification signal and transmits the decision notification signal to the touch processing unit when determining the execution mode, the touch processing unit performing the execution mode according to the decision notification signal.

2. The electronic device according to claim 1, wherein the processor determines and performs the execution mode according to the first notification signal.

3. The electronic device according to claim 1, wherein the touch processing unit determines whether the touch operation comprises a plurality of touch positions and determines whether all the plurality of touch positions are located in a first execution area or located in a second execution area; when all the plurality of touch positions is located in the first execution area or located in the second execution area, the touch processing unit transmits the corresponding first notification signal to the processor according to the touch signal; when the touch operation is located in the first execution area, the processor performs an interface setting corresponding to the first execution area, and when the touch operation is located in the second execution area, the processor performs an interface setting corresponding to the second execution area.

4. The electronic device according to claim 1, further comprising:
   at least one motion sensing unit electrically connected to the processor for detecting an object to generate a at least one detection signal and transmitting the detection signal to the processor;
   wherein the processor is configured to determine an execution mode according to the detection signal.

5. The electronic device according to claim 1, wherein when the touch signal is transmitted to the processor, the processor determines whether the touch operation conforms to a gesture operation according to the touch signal; if yes, the processor determines to switch from a current execution mode to another execution mode, or if not, the current execution mode is maintained.

6. The electronic device according to claim 5, wherein the gesture operation comprises at least one of a sliding touch or a multi-finger touch.

7. An electronic device, comprising:
   a processor; and
   a plurality of touch displays electrically connected to the processor, the plurality of touch displays comprising:
      a touch detection unit, configured to detect a touch operation to generate a touch signal; and
      a touch processing unit electrically connected to the touch detection unit for receiving the touch signal;

at least one motion sensing unit electrically connected to the processor for detecting an object to generate a at least one detection signal and transmitting the detection signal to the processor;

wherein the touch detection unit is configured to transmit the touch signal to the touch processing unit or the processor, wherein the processor is configured to determine an execution mode according to the detection signal.

8. An electronic device, comprising:

a processor; and a plurality of touch displays electrically connected to the processor, the plurality of touch displays comprising:

a touch detection unit, configured to detect a touch operation to generate a touch signal; and a touch processing unit electrically connected to the touch detection unit for receiving the touch signal;

wherein the touch detection unit is configured to transmit the touch signal to the touch processing unit or the processor, wherein when the touch signal is transmitted to the processor and the processor determines the execution mode according to the touch signal, the processor transmits a decision notification signal to the touch processing unit, the touch processing unit performing the execution mode according to the decision notification signal.

9. The electronic device according to claim 8, wherein the decision notification signal comprises execution area setting information, and the touch processing unit adjusts a size and execution mode of an execution area in the touch displays according to the execution area setting information.

* * * * *